P. W. MEEHAN.
Pipe-Clamps.

No. 197,560. Patented Nov. 27, 1877.

WITNESSES.
L. P. Longworthy
Chas. Larkin

INVENTOR.
Patrick W Meehan
by Joseph A Miller
Attorney

UNITED STATES PATENT OFFICE.

PATRICK W. MEEHAN, OF PROVIDENCE, RHODE ISLAND, ASSIGNOR TO SAMUEL M. SMITH, OF SAME PLACE.

IMPROVEMENT IN PIPE-CLAMPS.

Specification forming part of Letters Patent No. 197,560, dated November 27, 1877; application filed July 16, 1877.

*To all whom it may concern:*

Be it known that I, PATRICK W. MEEHAN, of the city and county of Providence, State of Rhode Island, have invented new and useful Improvements in Pipe-Clamps; and I hereby declare that the following is a full, clear, and exact description of the same, reference being had to the accompanying drawings, forming part of this specification.

This invention has reference to improvements in couplings, or means for uniting two lengths of hose or soft-metal pipes, or for uniting a faucet or nozzle to such pipe.

It consists in the peculiar arrangement, with an interior sleeve slightly tapering toward each end, and provided with saw-tooth sectioned ribs, of a clamp made either in one piece or in two pieces, arranged to interlock, or hinged together, as will be more fully set forth hereinafter.

Figure 1:
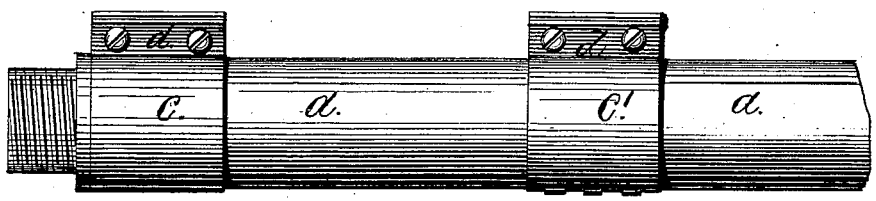
Figure 2:
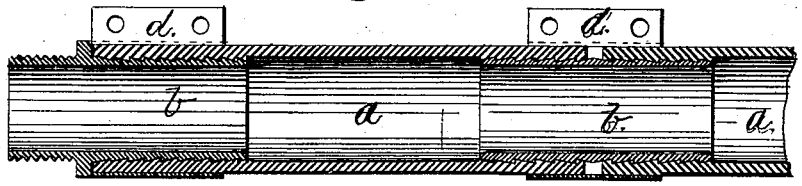
Figure 3:

Figure 1 represents a piece of hose-pipe, on one end of which a screw-coupling is secured by a clamp, and also a clamp is shown uniting two pieces of hose. Fig. 2 is a sectional view, showing the interior sleeve and the action of the saw-tooth sectioned ribs. Fig. 3 is a view of the interior sleeve, slightly tapering toward each end.

$a$ represents the hose or soft-metal pipe, as the coupling will answer to unite two pieces of lead pipe as well as two pieces of hose.

$b$ is the interior sleeve, slightly tapering, and provided with saw-tooth sectioned ribs, so that it can be forced into a pipe, and the elastic material or soft metal will close over the ribs and form a tight joint.

These serrations are annular, and made with the long bevel toward each end of the sleeve, and the sharp edge toward the middle section of the sleeve, so that it may enter the ends of the pipe or hose, and be readily forced into the same, and yet require great force to withdraw it.

C C' are metallic clamps, preferably made of sheet metal, and provided with two flanges, arranged to be brought together by clamping-screws, so that the band proper can be forced firmly around the hose or pipe. The clamps may be made in two pieces, so as to interlock, as shown, in the clamp C'; or each half may be provided with two flanges, and the two halves may be secured together by clamping-screws; or the two halves may be secured by a hinge on one side and the clamping-screws on the other. When made of sheet metal the clamp will answer all the usual purposes.

$d$ $d$ are the flanges, provided with clamping-screws, and, when used for hose, a handle may be secured between the flanges, by which the hose can be held when in use. This pipe-clamp can be readily applied to lead pipe, and two pieces may be united without solder, and a strong water-tight joint made by any unskilled person.

I am aware that serrated surfaces have been used, wherewith to connect the ends of pipes and flexible hose, and I do not claim such, broadly, but having formed the serrations with their beveled edges in opposite directions on the sleeve, and which, being larger in diameter toward the middle of the same, the pipe or hose is more readily forced upon the sleeve, and, when clamped from the outside, a great force is required to withdraw the ends of the pipe or hose.

Having thus described my invention, I claim as new and desire to secure by Letters Patent—

The sleeve $b$, tapering each way from the middle, having serrations arranged annularly over its entire length, the barbed edges of which, on each side of the central line, are turned inwardly, for the purpose of holding the ends of the hose or pipe, substantially as described.

PATRICK W. MEEHAN.

Witnesses:
JOSEPH A. MILLER,
H. S. BABCOCK.